(12) United States Patent
Brodin

(10) Patent No.: US 7,963,346 B2
(45) Date of Patent: Jun. 21, 2011

(54) POWER TOOL WITH ANGLE DRIVE AND PINION ADJUSTMENT

(75) Inventor: Hans Karl Johan Brodin, Djursholm (SE)

(73) Assignee: Atlas Copco Tools AB, Nacka (SE)

( * ) Notice: Subject to any disclaimer, the term of this patent is extended or adjusted under 35 U.S.C. 154(b) by 560 days.

(21) Appl. No.: 10/574,534

(22) PCT Filed: Oct. 4, 2004

(86) PCT No.: PCT/SE2004/001406
§ 371 (c)(1),
(2), (4) Date: Mar. 5, 2007

(87) PCT Pub. No.: WO2005/032769
PCT Pub. Date: Apr. 14, 2005

(65) Prior Publication Data
US 2007/0181322 A1    Aug. 9, 2007

(30) Foreign Application Priority Data

Oct. 3, 2003  (SE) ...................................... 0302623

(51) Int. Cl.
*E21B 3/00* (2006.01)
*F16H 1/12* (2006.01)
(52) U.S. Cl. ............. 173/217; 173/216; 74/417; 74/423
(58) Field of Classification Search ............... 173/48, 173/216, 217; 464/149, 182; 74/417, 423
See application file for complete search history.

(56) References Cited

U.S. PATENT DOCUMENTS

| 2,604,795 | A | * | 7/1952 | Ristow | 74/417 |
| 2,697,362 | A | * | 12/1954 | Keesling | 74/417 |
| 3,838,588 | A | * | 10/1974 | Johnson | 72/114 |
| 3,866,692 | A | * | 2/1975 | Stelljes | 173/48 |
| 3,901,098 | A | * | 8/1975 | Jinkins | 74/417 |

(Continued)

FOREIGN PATENT DOCUMENTS

EP   0548717 A1   6/1993

(Continued)

*Primary Examiner* — Rinaldi I Rada
*Assistant Examiner* — Gloria R Weeks
(74) *Attorney, Agent, or Firm* — Holtz, Holtz, Goodman & Chick, PC

(57) ABSTRACT

A power tool comprises a housing (10;110) with an output shaft (11;111) driven by a rotation motor and an angle drive (12;112) connecting the output shaft (11;111) to the motor, wherein the angle drive (12;112) comprises a drive spindle (15;115) connected to the motor and carrying a pinion (15; 115), and a bevel gear (17;117) secured to the output shaft (11;111). The drive spindle (15;115) and the pinion (16:116) are supported in the housing (10;110) via a ball type thrust bearing (24;124) having in one of its embodiments an inner ring (31) with a thread for cooperation with a threaded portion (33) on the drive spindle (15), and an outer ring (26;126) which is rigidly secured in the housing (10). The inner ring (31) is adjustable and lockable relative to the drive spindle, (15) by an annular lock element (35). In an alternative embodiment the inner ring (131) is secured to the drive spindle (115), whereas the outer ring (126) is threaded into a threaded portion of housing (110) such that the outer ring (126), the drive spindle (115) and the pinion (116) are adjustable relative to the housing (110) and the bevel gear (117). A deformable lock element (135) the outer ring (126) in set position.

6 Claims, 2 Drawing Sheets

U.S. PATENT DOCUMENTS

| | | | | |
|---|---|---|---|---|
| 4,215,594 A | * | 8/1980 | Workman et al. | 475/266 |
| 4,403,679 A | * | 9/1983 | Snider | 184/64 |
| 4,531,847 A | | 7/1985 | F'Geppert | |
| 6,142,242 A | * | 11/2000 | Okumura et al. | 173/48 |
| 6,709,161 B2 | * | 3/2004 | Yakura et al. | 384/488 |
| 6,913,090 B2 | * | 7/2005 | Droste et al. | 173/109 |
| 7,033,082 B2 | * | 4/2006 | Yakura et al. | 384/528 |
| 7,134,509 B2 | * | 11/2006 | Rahm | 173/216 |
| 7,216,749 B2 | * | 5/2007 | Droste | 192/56.61 |
| 2002/0029647 A1 | * | 3/2002 | Brooks | 74/424 |
| 2003/0026509 A1 | * | 2/2003 | Yakura et al. | 384/484 |
| 2004/0134673 A1 | * | 7/2004 | Droste | 173/178 |
| 2004/0211574 A1 | * | 10/2004 | Droste et al. | 173/29 |
| 2004/0216976 A1 | * | 11/2004 | Droste | 192/55.1 |

FOREIGN PATENT DOCUMENTS

| | | |
|---|---|---|
| GB | 2321865 A | 8/1998 |

* cited by examiner

POWER TOOL WITH ANGLE DRIVE AND PINION ADJUSTMENT

This application is a U.S. National Phase Application under 35 USC 371 of International Application PCT/SE2004/001406 filed Oct. 4, 2004.

BACKGROUND OF THE INVENTION

The invention relates to a power tool which comprises a housing, an output shaft connected a rotation motor to via an angle drive, wherein the angle drive comprises a drive spindle with a pinion, and a bevel gear connected to the output shaft, and a thrust bearing axially supporting the drive spindle relative to the housing.

In power tools of this type there is a problem related to a limited service life of the angle drive. Particularly, this problem occurs in power wrenches where relatively heavy torque loads are to be transferred. This is mainly due to the fact that the angle drive, gears and bearings together are of a small size in relation to a heavy transferred torque load, which means that the contact pressure on the gear teeth flanks is very high. In order to cope with this high contact pressure it is of greatest importance that the gear teeth engagement between the driving pinion and the bevel gear is absolutely correct under all load conditions, of course also that the gears are of a suitable material properly heat treated and machined.

To illustrate the magnitude of the challenge in seeking to solve the above mentioned problem a comparison can made with a gear box of a car where the service life of the gears in the gear box would be reduced to less than 1% of its normal service life if they were stressed to the same level as in a power wrench.

To obtain an accurate engagement between the pinion and bevel gear teeth the play between the gears is crucial. This play depends mainly on the axial position of the pinion and, hence, the drive spindle. The acceptable tolerance for the axial position of the pinion relative to the bevel gear is no more than ±0.01 mm. A common way of adjusting the pinion position is to use shims, but that technique is cumbersome and not accurate enough. The multiple contact surfaces between the shims, the drive spindle bearing and the housing also add to a slightly resilient support of the bearing and an accuracy of ±0.01 mm of the drive spindle and pinion position is not at all guaranteed. Moreover, the shims technique is rather time consuming and not suitable in mass production.

Another way to adjust a bearing play is to use threaded supported elements for the axial fixation of one of the ball races. That solution, however, contains another difficulty, namely that the ball race must not rotate relative its support during operation but still be easily movable during adjustment. These two contradictory features are very hard to accomplish.

SUMMARY OF THE INVENTION

The main object of the invention is to provide a power tool with an angle drive wherein an accurate enough setting of the pinion to bevel gear play is easily and safely accomplished.

This is accomplished by an improved pinion bearing arrangement which in the following specification and claims is described as two alternative embodiments.

The two preferred embodiments of the invention are described in detail below with reference to the accompanying drawings.

DETAILED DESCRIPTION

Figure 1:
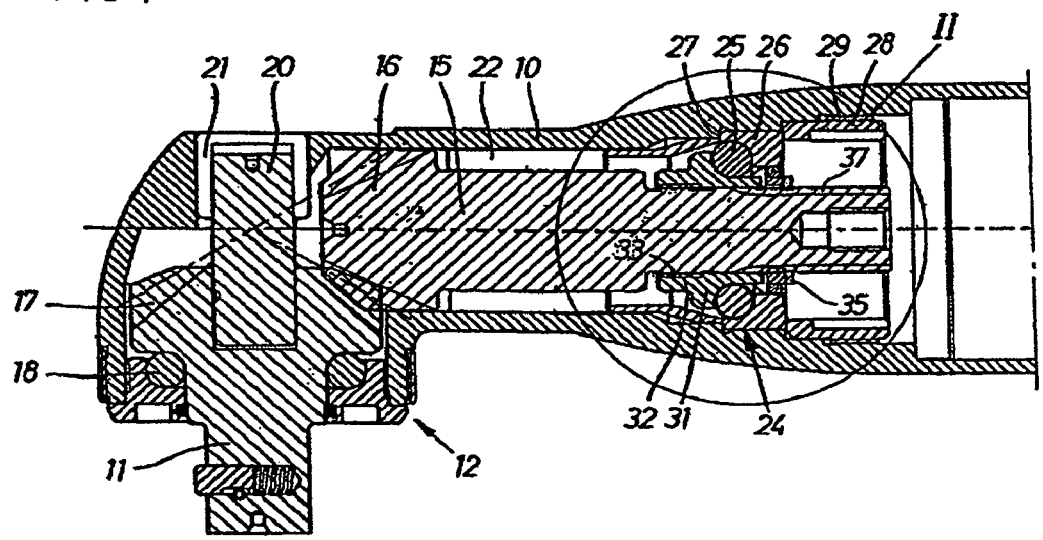
FIG. 1 shows a longitudinal section through the forward end of a power tool including the angle drive according to a first embodiment of the invention.
Figure 2:
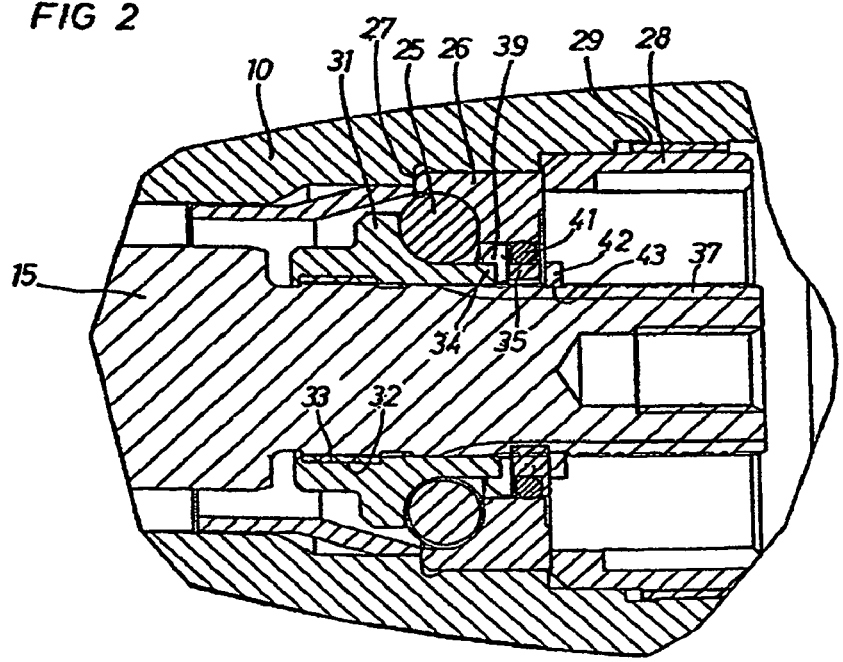
FIG. 2 shows, on a larger scale, a fraction II of FIG. 1.
Figure 3:
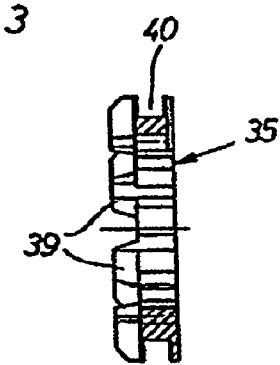
FIG. 3 shows a side view of a lock element comprised in the power tool illustrated in FIGS. 1 and 2.
Figure 4:
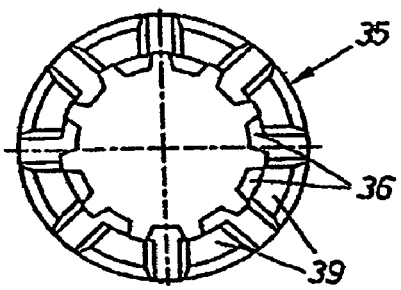
FIG. 4 shows a front view of the lock element in FIG. 3.

In FIGS. 1 and 2 there is shown a section through a power tool which comprises a housing 10 supporting an output shaft 11 driven by a rotation motor (not shown), and an angle drive 12 connecting the motor to the output shaft 11. The angle drive 12 comprises a drive spindle 15 coupled to the motor and being formed integrally as a one-piece member with a pinion 16, and a bevel gear 17 formed integrally with the output shaft 11. At its forward end the output shaft 11 is journalled in a ball bearing 18, whereas the rear end of the output shaft 11 comprises an extension 20 which is supported in the housing 10 by a needle bearing 21.

The drive spindle 15 is rotatively journalled in the housing 10 via a needle bearing 22 for transferring radial forces and a ball bearing 24 for transferring axial forces to the housing 10. At transfer of a torque load via the angle drive 12 both the drive spindle 15 and the output shaft 11 are exposed to axial forces which are transferred to the housing 10 via the bearings 18 and 24.

The bearing 24 comprises an angular contact bearing of the type having a full number of balls 25 without any separating ball cage. The bearing 24 comprises an outer ring 26 secured between a shoulder 27 in the housing 10 and a ring screw 28 co-operating with a threaded portion 29 in the housing 10. The bearing 24 also includes an inner ring 31 which at its forward end is formed with a internal thread 32 for co-operation with a threaded portion 33 on the drive spindle 15. At its rear end, the inner ring 31 is operation with an annular lock element 35.

The lock element 35 is formed with inwardly directed teeth 36 for co-operation with axially directed splines 37 on the drive spindle 15, and has axially directed teeth 39 for engagement with the teeth 34 on the inner ring 31. The lock element 35 is also provided with a circumferential groove 40 for supporting an O-ring seal 41. For arresting the lock element 35 in its locking position, i.e. in engagement with both the drive spindle splines 37 and the teeth on the inner ring 31, there is provided a lock ring 42 supported in a peripheral groove 43 on the drive spindle 15.

When assembling the angle drive 12 the output shaft 11 and the bearing 18 are first put in place. Then, the thrust bearing 24 is assembled and mounted on the drive spindle 15 with the inner ring 31 threaded onto the drive spindle portion 33 as far as possible. Thereafter, the drive spindle 15 together with the bearing 24 is introduced into the housing 10 until the outer ring 26 of the bearing 24 rests against the shoulder 27 in the housing 10. The outer ring 26 is secured to the housing 10 by mounting and tightening of the ring screw 28. In this position the pinion 16 engages the bevel gear 17, but there is a substantial play between the gear teeth.

Now, the axial play between the pinion 16 and the bevel gear 17 is to be set to obtain a correct engagement between the gear teeth of the pinion 16 and bevel gear 17. This is accomplished by rotating the inner ring 31 of the thrust bearing 24 such that the inner ring 31 moves backwards pressing the balls 25 against the outer ring 26. This results in a forward movement of the drive spindle 15, and when the drive spindle 15 has come to a position where the play between the pinion 16 and the bevel gear 17 is nill and there is experienced a certain resistance against rotation the inner ring 31. Then, the ring 31 is rotated backwards a certain predetermined angle for obtaining the correct desired play in the angle drive. As the correct play between the pinion 16 and bevel gear 17 is set the lock element 35 is shoved along the drive spindle splines 37 until the axially directed teeth 39 engage the teeth 34 of the inner ring 31. Then, the lock ring 42 is mounted in the groove 43 in the drive spindle 15. Now, the inner ring 31 is rotationally locked, and the set play between the pinion 16 and bevel gear 17 is safely maintained.

Figure 5:
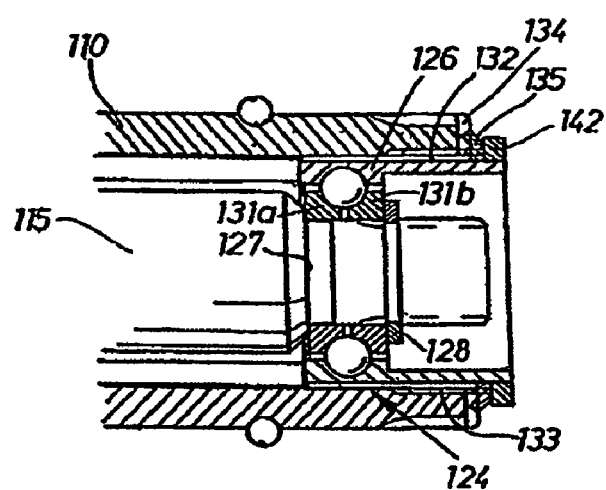
FIG. 5 illustrates the pinion bearing arrangement according to a second embodiment of the invention.
Figure 6:
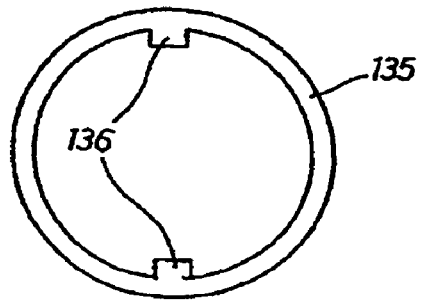
FIG. 6 shows a lock element for securing the setting of the pinion the embodiment illustrated in FIG. 5.

In the embodiment illustrated in FIG. 5, the inner ring of the bearing 124 is divided into two halves 131a, b one of which 131a is supported against a shoulder 127 on the drive spindle 115. The other inner ring half 131b is axially locked by a lock ring 128. The outer ring 126 of the bearing 124 has a rear extension with an external thread 132 arranged for co-operation with a threaded portion 133 of the housing 110. Moreover, the outer ring 126 is formed with two grooves (not illustrated) on which is mounted a lock element 135 in the form of a sheet steel washer with two inwardly directed teeth 136 for co-operation with the non-illustrated grooves on the outer ring 126. The outer ring 126 is safely locked against further rotation in that a rear flange 142 on the lock element 135 is deformed into engagement with axially directed teeth 134 at the end of a forward section of the housing 110. Thereby, the outer ring 126 is maintained in its correct position.

Assembling the thrust bearing according to this embodiment of the invention is similar to the process described above, namely put together the bearing 124 separately with the drive spindle 115 and introducing this assembly into the housing 110, thereby threading the outer ring 126 into the threaded portion 133 of the housing 110 until there is experienced a torque resistance when rotating the angle drive. Then, the outer ring 126 is rotated a predetermined angle in a reverse direction, thereby pulling the bearing 124 and the drive spindle 115 a distance corresponding to the desired gear teeth play between the pinion 116 and the bevel gear 117. Then, the lock element 135 is deformed to engage the teeth 134 on the housing 110, so as to secure the obtained angular position of the outer ring 126 and the set play between the gear teeth of the angle drive.

Both the above described bearing arrangements are based on the inventive idea that either one of the ball bearing rings of the thrust bearing is axially adjustable, whereas the other one of the bearing rings is rigidly secured to the housing or the drive spindle, alternatively. This means an accurate and simple setting of the axial play between the pinion and the bevel gear of the angle drive.

The invention claimed is:

1. A power tool comprising:
   a housing,
   an output shaft driven by a rotation motor; and
   an angle drive mechanism coupling the motor to the output shaft, said angle drive mechanism including: a drive spindle coupled to the motor and carrying a pinion; a bevel gear mounted on the output shaft; wherein said drive spindle is axially supported relative to the housing by a ball bearing having an inner ring and an outer ring; and an adjusting device which sets an axial position of said drive spindle and said pinion relative to the bevel gear;
   wherein said outer ring is axially secured relative to the housing;
   wherein said adjusting device comprises:
      a threaded portion on said drive spindle;
      an internal thread formed integrally with said inner ring and arranged to cooperate with said threaded portion on said drive spindle; and
      a coupling device arranged to rotationally lock said inner ring relative to said drive spindle as a desired axial position of said drive spindle is obtained; and
   wherein said coupling device comprises:
      a number of axially directed coupling teeth on said inner ring; and
      an annular coupling element provided with axially directed engagement teeth for cooperation with said coupling teeth;
      said coupling element having radially inwardly directed engagement teeth for cooperation with splines on said drive spindle.

2. A power tool according to claim 1, further comprising a lock ring received in a circumferential groove in said drive spindle, said lock ring being arranged to axially lock said coupling element in position.

3. A power tool according to claim 2, wherein said pinion is formed integrally as a one-piece member with said drive spindle.

4. A power tool according to claim 1, wherein said ball bearing comprises an angular contact ball bearing.

5. A power tool according to claim 1, wherein said pinion is formed integrally as a one-piece member with said drive spindle.

6. A power tool according to claim 4, wherein said pinion is formed integrally as a one-piece member with said drive spindle.

* * * * *